(12) United States Patent
Su et al.

(10) Patent No.: US 10,459,704 B2
(45) Date of Patent: Oct. 29, 2019

(54) CODE RELATIVES DETECTION

(71) Applicant: THE TRUSTEES OF COLUMBIA UNIVERSITY IN THE CITY OF NEW YORK, New York, NY (US)

(72) Inventors: Fang-hsiang Su, New York, NY (US); Lakshminarasimhan Sethumadhavan, New York, NY (US); Gail E. Kaiser, New York, NY (US); Tony Jebara, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/549,785

(22) PCT Filed: Feb. 8, 2016

(86) PCT No.: PCT/US2016/017145
§ 371 (c)(1),
(2) Date: Aug. 9, 2017

(87) PCT Pub. No.: WO2016/130542
PCT Pub. Date: Aug. 18, 2016

(65) Prior Publication Data
US 2018/0046441 A1 Feb. 15, 2018

Related U.S. Application Data

(60) Provisional application No. 62/114,466, filed on Feb. 10, 2015.

(51) Int. Cl.
*G06F 8/41* (2018.01)

(52) U.S. Cl.
CPC .................. *G06F 8/433* (2013.01)

(58) Field of Classification Search
CPC ..... G06F 8/40; G06F 8/42; G06F 8/43; G06F 8/433
(Continued)

(56) References Cited

U.S. PATENT DOCUMENTS 7,275,029 B1* 9/2007 Gao .................... G06F 17/2735
704/1
8,312,427 B2* 11/2012 Hutchison ............... G06F 8/751
717/110

(Continued)

FOREIGN PATENT DOCUMENTS

JP 2003029978 1/2003
WO 20120079230 6/2012

OTHER PUBLICATIONS

Su et al., "Code Relatives: Detecting Similarly Behaving Software", Nov. 13-18, 2016, © 2016 ACM. 978-1-4503-4218-6/16/11, pp. 702-714. (Year: 2016).*

(Continued)

*Primary Examiner* — Marina Lee
(74) *Attorney, Agent, or Firm* — Occhiuti & Rohlicek LLP

(57) ABSTRACT

Disclosed are devices, systems, apparatus, methods, products, media, and other implementations, including a method that includes generating for a code segment of a first process an instruction dependency graph representative of behavior of the first process, obtaining respective one or more instruction dependency graphs representative of behaviors of code segments for one or more other processes, and determining, based on the first instruction dependency graph for the first process and the respective one or more instruction dependency graphs for the one or more other processes, a level of similarity between the first process and at least one of the one or more other processes.

19 Claims, 7 Drawing Sheets

(58) Field of Classification Search
USPC .................................................. 717/127–162
See application file for complete search history.

(56) References Cited

U.S. PATENT DOCUMENTS

| | | | | |
|---|---|---|---|---|
| 8,689,191 | B2* | 4/2014 | Dolby | 717/136 |
| 8,739,144 | B2* | 5/2014 | Stoicescu | G06F 8/4434 717/151 |
| 8,819,856 | B1 | 8/2014 | Tiffe et al. | |
| 8,931,092 | B2* | 1/2015 | Wyschogrod | G06F 21/562 726/22 |
| 9,110,769 | B2* | 8/2015 | Zhang | G06F 8/751 |
| 2006/0004528 | A1* | 1/2006 | Uehara | G06F 8/71 702/20 |
| 2008/0184369 | A1* | 7/2008 | Ahn | G06F 21/56 726/23 |
| 2011/0219361 | A1* | 9/2011 | Dolby | 717/136 |
| 2011/0225572 | A1* | 9/2011 | Stoicescu | G06F 8/4434 717/156 |
| 2011/0246968 | A1* | 10/2011 | Zhang | G06F 8/751 717/125 |
| 2011/0258532 | A1* | 10/2011 | Ceze | G06F 17/30902 715/234 |
| 2014/0059684 | A1* | 2/2014 | Wyschogrod | G06F 21/562 726/23 |
| 2015/0020048 | A1* | 1/2015 | Misra | G06F 8/74 717/120 |
| 2015/0074675 | A1* | 3/2015 | Qi | G06F 8/443 718/103 |
| 2018/0046441 | A1* | 2/2018 | Su | G06F 8/433 |
| 2018/0285101 | A1* | 10/2018 | Yahav | G06F 8/53 |

OTHER PUBLICATIONS

N. S. Altman, "An introduction to kernel and nearest-neighbor nonparametric regression" The American Statistician, 46(3):175-185, 1992.
Amazon ec2. http://aws.amazon.com/ec2/instance-types/. Accessed: Aug. 17, 2015.
Asm framework. http://asm.ow2.org/index.html. Accessed: Feb. 5, 2015.
V. Avdiienko, K. Kuznetsov, A. Gorla, A. Zeller, S. Arzt, S. Rasthofer, and E. Bodden, "Mining apps for abnormal usage of sensitive data" In 2015 International Conference on Software Engineering (ICSE), ICSE '15, pp. 426-436, 2015.
B. S. Baker, "A program for identifying duplicated code" In Computer Science and Statistics: Proc. Symp. on the Interface, pp. 49-57, 1992.
I. D. Baxter, A. Yahin, L. Moura, M. Sant'Anna, and L. Bier, "Clone detection using abstract syntax trees" In Proceedings of the International Conference on Software Maintenance, ICSM '98, pp. 368-377, 1998.
K. M. Borgwardt and H.-P. Kriegel, "Shortest-path kernels on graphs" In Proceedings of the Fifth IEEE International Conference on Data Mining, ICDM '05, pp. 74-81, 2005.
J. F. Bowring, J. M. Rehg, and M. J. Harrold, "Active learning for automatic classification of software behavior" In Proceedings of the 2004 ACM SIGSOFT International Symposium on Software Testing and Analysis, ISSTA '04, pp. 195-205, 2004.
S. Brin and L. Page, "The anatomy of a large-scale hypertextual web search engine" In Proceedings of the Seventh International Conference on World Wide Web 7, WWW7, pp. 107-117, 1998.
W. W. Cohen, P. Ravikumar, and S. E. Fienberg, "A comparison of string distance metrics formname-matching tasks" In Proceedings of IJCAI-03 Workshop on Information Integration, pp. 73-78, 2003.
Deckard source code. https://github.com/skyhover/Deckard. Accessed: Mar. 20, 2015.
J. Demme and S. Sethumadhavan, "Approximate graph clustering for program characterization" ACM Trans. Archit. Code Optim., 8(4):21:1-21:Jan. 21, 2012.

N. DiGiuseppe and J. A. Jones. "Software behavior and failure clustering: An empirical study of fault causality" In Proceedings of the 2012 IEEE Fifth International Conference on Software Testing, Verification and Validation, ICST '12, pp. 191-200, 2012.
M. Egele, M. Woo, P. Chapman, and D. Brumley. "Blanket execution: Dynamic similarity testing for program binaries and components" In 23rd USENIX Security Symposium (USENIX Security 14), pp. 303-317, 2014.
M. Gabel, L. Jiang, and Z. Su, "Scalable detection of semantic clones" In Proceedings of the 30th International Conference on Software Engineering, ICSE '08, pp. 321-330, 2008.
M. R. Garey and D. S. Johnson, "Computers and Intractability; A Guide to the Theory of NP-Completeness" W. H. Freeman & Co., New York, NY, USA, 1990.
Google code jam. https://code.google.com/codejam. Accessed: Sep. 18, 2018.
L. Jiang, G. Misherghi, Z. Su, and S. Glondu. "Deckard: Scalable and accurate tree-based detection of code clones." In Proceedings of the 29th International Conference on Software Engineering, ICSE '07, pp. 96-105, 2007.
L. Jiang and Z. Su, "Automatic mining of functionally equivalent code fragments via random testing" In Proceedings of the Eighteenth International Symposium on Software Testing and Analysis, ISSTA '09, pp. 81-92, 2009.
Java matrix benchmark. http://lessthanoptimal.github.io/Java-Matrix-Benchmark/. Accessed: Sep. 18, 2018.
J. H. Johnson, "Substring matching for clone detection and change tracking." In Proceedings of the International Conference on Software Maintenance, ICSM '94, pp. 120-126, 1994.
Java virutal machine speicification. http://docs.oracle.com/javase/specs/jvms/se7/html/. Accessed: Sep. 18, 2018.
T. Kamiya, S. Kusumoto, and K. Inoue, "Ccfinder: A multilinguistic token-based code clone detection system for large scale source code" IEEE Trans. Softw. Eng., 28(7):654-670, Jul. 2002. [Reprint].
R. Komondoor and S. Horwitz, "Using slicing to identify duplication in source code" In Proceedings of the 8th International Symposium on Static Analysis, SAS '01, pp. 40-56, 2001.
R. Koschke, R. Falke, and P. Frenzel, "Clone detection using abstract syntax suffix trees" In Proceedings of the 13th Working Conference on Reverse Engineering, WCRE '06, pp. 253-262, 2006.
J. Krinke, "Identifying similar code with program dependence graphs" In Proceedings of the 8th Working Conference on Reverse Engineering, pp. 301-309, 2001.
A. Kuhn, S. Ducasse, and T. G'irba, "Semantic clustering: Identifying topics in source code" Inf. Softw. Technol., 49(3):230-243, Mar. 2007.
P. Lawrence, B. Sergey, R. Motwani, and T. Winograd, "The pagerank citation ranking: Bringing order to the web" Technical report, Stanford University, 1998.
Z. Li, S. Lu, S. Myagmar, and Y. Zhou, "Cp-miner: A tool for finding copy-paste and related bugs in operating system code" In Proceedings of the 6th Conference on Symposium on Opearting Systems Design & Implementation—vol. 6, OSDI'04, pp. 176-192, 2004.
C. Liu, C. Chen, J. Han, and P. S. Yu, "Gplag: Detection of software plagiarism by program dependence graph analysis" In Proceedings of the 12th ACM SIGKDD International Conference on Knowledge Discovery and Data Mining, KDD '06, pp. 872-881, 2006.
J. I. Maletic and N. Valluri, "Automatic software clustering via latent semantic analysis" In Proceedings of the 14th IEEE International Conference on Automated Software Engineering, ASE '99, pp. 251-, 1999.
C. McMillan, M. Grechanik, and D. Poshyvanyk, "Detecting similar software applications" In Proceedings of the 34th International Conference on Software Engineering, ICSE '12, pp. 364-374, 2012.
B. T. Messmer and H. Bunke, "Efficient subgraph isomorphism detection: A decomposition approach" IEEE Trans. Knowl. Data Eng., 12(2):307-323, 2000.
A. T. Nguyen and T. N. Nguyen, "Graph-based statistical language model for code" In Proceedings of the 37th International Conference on Software Engineering, ICSE '15, pp. 858-868, 2015.

(56) References Cited

OTHER PUBLICATIONS

L. P. Cordella, P. Foggia, C. Sansone, and M. Vento, "A (sub)graph isomorphism algorithm for matching large graphs" IEEE Trans. Pattern Anal. Mach. Intell., 26(10):1367-1372, Oct. 2004.
K. Riesen, X. Jiang, and H. Bunke, "Exact and inexact graph matching: Methodology and applications" In Managing and Mining Graph Data vol. 40 of Advances in Database Systems, pp. 217-247. Springer, 2010.
C. K. Roy, J. R. Cordy, and R. Koschke, "Comparison and evaluation of code clone detection techniques and tools: A qualitative approach" Sci. Comput. Program., 74(7):470-495, May 2009.
J. R. Ullmann "An algorithm for subgraph isomorphism" J. ACM, 23(1):31-42, Jan. 1976.
F. Umemori, K. Konda, R. Yokomori, and K. Inoue, "Design and implementation of bytecode-based Java slicing system" In SCAM, pp. 108-117. IEEE Computer Society, 2003.
Fang-Hsiang, Kenneth Harvey, Simha Sethumadhavan, Gail Kaiser, and Tony Jebara, "Code Relatives: Detecting Similar Software Behavior." (2015).
Fang-Hsiang, Simha Sethumadhavan, Gail Kaiser and Tony Jebara "Detectomg Code Relatives." (2015).
S. V. N. Vishwanathan, N. N. Schraudolph, R. Kondor, and K. M. Borgwardt "Graph kernels" J. Mach. Learn. Res., 11:1201-1242, Aug. 2010.
W. Yang, X. Xiao, B. Andow, S. Li, T. Xie, and W. Enck, "Appcontext: Differentiating malicious and benign mobile app behaviors using context" In Proceedings of the 37th International Conference on Software Engineering, ICSE '15, pp. 303-313, 2015.

\* cited by examiner

600

| Year | Problem Set | Abbrev. | Proj. | # of Graphs |
|---|---|---|---|---|
| 2011 | Irregular Cake | I | 48(30) | 762 |
| 2012 | Perfect Game | P | 48(34) | 295 |
| 2013 | Cheaters | C | 29(21) | 612 |
| 2014 | Magical Tour | M | 46(33) | 479 |

FIG. 6

CODE RELATIVES DETECTION

CROSS-REFERENCE TO RELATED APPLICATIONS

This application is the National Stage, under 35 USC 371, of PCT Application No. PCT/US2016/017145 filed on Feb. 8, 2016, which claims the benefit of, and priority to, U.S. Provisional Patent Application No. 62/114,466, entitled "A GRAPH-BASED DYNAMIC CODE CLONE DETECTOR WITH LINK ANALYSIS," and filed Feb. 10, 2015, the contents of all of which are incorporated herein by reference in their entireties.

STATEMENT REGARDING FEDERALLY SPONSORED RESEARCH

This invention was made with government support under Grant No. CCF-1302269 by the National Science Foundation (NSF). The government has certain rights in the invention.

BACKGROUND

In the era of the open source projects, new software libraries and APIs are created in large volumes. One challenge relating to these new software libraries and API's is how to automatically detect replaceable segments of source code in the existing systems. Detection of similar code segments can also be used to help developers understand and maintain systems, and to identify code plagiarism. Although it is useful to identify syntactically similar code fragments (called code clones), it is also useful to identify processes/programs that have similar behavior, even if their code is not necessarily alike.

SUMMARY

In some variations, a method is provided that includes generating for a code segment of a first process an instruction dependency graph representative of behavior of the first process, obtaining respective one or more instruction dependency graphs representative of behaviors of code segments for one or more other processes, and determining, based on the first instruction dependency graph for the first process and the respective one or more instruction dependency graphs for the one or more other processes, a level of similarity between the first process and at least one of the one or more other processes.

Embodiments of the method may include at least some of the features described in the present disclosure, including one or more of the following features.

The method may further include identifying the at least one of the one or more other processes as a code relative of the first process in response to a determination that the level of similarity between the first process and the at least one of the one or more other processes exceeds a pre-determined threshold.

The first instruction dependency graph may include multiple subgraph portions and data defining dependency between the multiple subgraph portions, and each of the respective one or more instruction dependency graphs may include an associated set of subgraph portions and data defining dependency between the subgraph portions.

Determining the level of similarity between the first process and the at least one of the one or more other processes may include determining, through a subgraph isomorphism process, the level of similarity between the first process and the at least one of the one or more other processes based on the multiple subgraph portions and the data defining dependency between the multiple subgraph portions for the first instruction dependency graph, and based on the associated sets of subgraph portions and the data defining the dependency between the subgraph portions for the one or more instruction dependency graphs for the one or more other processes.

Generating the first instruction dependency graph may include parsing the code segment for the first process into multiple dependency graphs, wherein at least one of the multiple dependency graphs corresponds to a portion of the code segment that includes a call to another process portion, and another of the multiple dependency graphs corresponds to the called other process portion.

Generating the first instruction dependency graph may include generating a multi-vertices graph with edges connecting at least some of vertices in the multi-vertices graph, with each of the vertices representing at least one instruction of the code segment, and each of the edges representing a dependency between corresponding two or more instructions represented as two or more vertices in the multi-vertices graph.

Each of the edges may be assigned a dependency type value representative of a type of dependency between the instructions connected to the respective each of the edges.

Determining the level of similarity between the first process and the at least one of the one or more other processes may include determining a ranking of the vertices of the multi-vertices graph for the first process, and deriving a first dynamic vector for the first process, representative of an ordering of the vertices of the multi-vertices graph, based on the determined ranking of the vertices of the multi-vertices graph.

The method may further include computing a similarity distance between the first dynamic vector for the first process and at least one dynamic vector derived for at least one of the one or more instruction dependency graphs for the at least one of the one or more other processes.

The method may further include determining that the at least one of the one or more other processes is a code relative of the first process when the similarity distance computed between the first dynamic vector and the at least one dynamic vector derived for at least one of the one or more instruction dependency graphs, corresponding to the at least one of the one or more other processes, exceeds a dynamic pre-determined dynamic threshold.

In some variations, a system is provided that includes at least one processor, and storage media comprising computer instructions. The computer instructions, when executed on the at least one processor, cause operations including generating for a code segment of a first process an instruction dependency graph representative of behavior of the first process, obtaining respective one or more instruction dependency graphs representative of behaviors of code segments for one or more other processes, and determining, based on the first instruction dependency graph for the first process and the respective one or more instruction dependency graphs for the one or more other processes, a level of similarity between the first process and at least one of the one or more other processes.

Embodiments of the system may include at least some of the features described in the present disclosure, including at least some of the features described above in relation to the method.

In some variations, an apparatus is provided that includes means for generating for a code segment of a first process an instruction dependency graph representative of behavior of the first process, means for obtaining respective one or more instruction dependency graphs representative of behaviors of code segments for one or more other processes, and means for determining, based on the first instruction dependency graph for the first process and the respective one or more instruction dependency graphs for the one or more other processes, a level of similarity between the first process and at least one of the one or more other processes.

Embodiments of the apparatus may include at least some of the features described in the present disclosure, including at least some of the features described above in relation to the method and to the system, as well as one or more of the following features.

The apparatus may further include means for identifying the at least one of the one or more other processes as a code relative of the first process in response to a determination that the level of similarity between the first process and the at least one of the one or more other processes exceeds a pre-determined threshold.

The means for determining the level of similarity between the first process and the at least one of the one or more other processes may include means for determining, through a subgraph isomorphism process, the level of similarity between the first process and the at least one of the one or more other processes based on the multiple subgraph portions and the data defining dependency between the multiple subgraph portions for the first instruction dependency graph, and based on the associated sets of subgraph portions and the data defining the dependency between the subgraph portions for the one or more instruction dependency graphs for the one or more other processes.

The means for generating the first instruction dependency graph may include means for generating a multi-vertices graph with edges connecting at least some of vertices in the multi-vertices graph, with each of the vertices representing at least one instruction of the code segment, and each of the edges representing a dependency between corresponding two or more instructions represented as two or more vertices in the multi-vertices graph.

The means for determining the level of similarity between the first process and the at least one of the one or more other processes may include means for determining a ranking of the vertices of the multi-vertices graph for the first process, means for deriving a first dynamic vector for the first process, representative of an ordering of the vertices of the multi-vertices graph, based on the determined ranking of the vertices of the multi-vertices graph, means for computing a similarity distance between the first dynamic vector for the first process and at least one dynamic vector derived for at least one of the one or more instruction dependency graphs for the at least one of the one or more other processes, and means for determining that the at least one of the one or more other processes is a code relative of the first process when the similarity distance computed between the first dynamic vector and the at least one dynamic vector derived for at least one of the one or more instruction dependency graphs, corresponding to the at least one of the one or more other processes, exceeds a dynamic pre-determined dynamic threshold.

In some variations, a computer readable media is provided that stores a set of instructions executable on at least one programmable device that, when executed, causes operations comprising generating for a code segment of a first process an instruction dependency graph representative of behavior of the first process, obtaining respective one or more instruction dependency graphs representative of behaviors of code segments for one or more other processes, and determining, based on the first instruction dependency graph for the first process and the respective one or more instruction dependency graphs for the one or more other processes, a level of similarity between the first process and at least one of the one or more other processes.

Embodiments of the computer readable media may include at least some of the features described in the present disclosure, including at least some of the features described above in relation to the method, to the system, and to the apparatus.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

FIG. 6 is a table providing details of data sets used in the testing of the implementations described herein.

Like reference symbols in the various drawings indicate like elements.

DESCRIPTION

Figure 1:
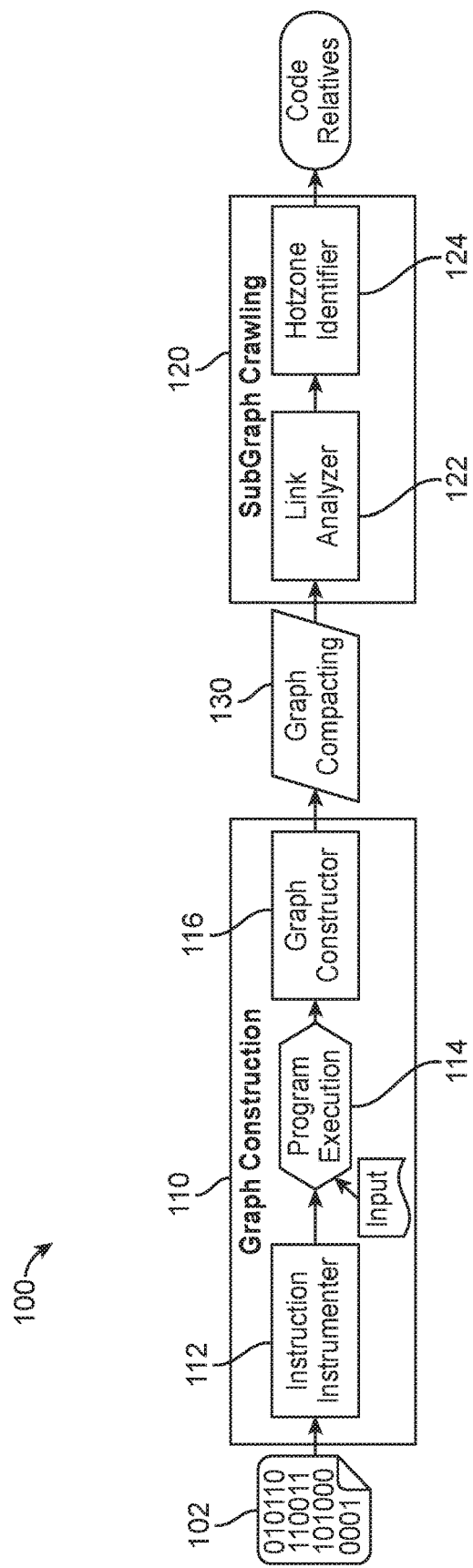
FIG. 1 is a diagram of a high-level architecture for a system to detect code relatives and/or code clones.

Described herein are systems, devices, apparatus, methods, computer program products, media, and other implementations to detect code relatives (e.g., code segments with dynamically similar execution features). Such code relative detectors can also be used to detect code clones (syntactically similar programs). Code relatives can be used for such tasks as implementation-agnostic code search, and classification of code with similar behavior for human understanding. To detect code relatives, an example implementation (referred to as "DyCLINK") is provided which constructs an approximate runtime representation of code using a dynamic instruction graph. In some embodiments, a link analysis based subgraph matching process can be used with the DyCLINK implementation in order to detect fine-grained code relatives efficiently. For example, a procedure, referred to as LinkSub, was develop to mitigate the prohibitive time complexity of subgraph matching in program analysis. LinkSub treats the dynamic instruction graph as a network, and ranks the nodes (e.g., via a PageRank procedure or another ranking procedure) to identify the most important ones. The important nodes form the centroids of dynamic instruction graphs, which help in selecting candidate nodes for subgraph matching. The use of link analysis not only reduces the cost of traditional graph isomorphism detection, but also produces program representations independent of how the computations are expressed in the code. In experimentations and testing performed using the DyCLINK implementation to analyze a large amount of prospective subgraph matches, the results showed that DyCLINK detected not only code relatives, but also code clones that conventional systems were unable to identify. In a code classification problem, DyCLINK achieved better precision than a conventional system.

Thus, in some embodiments, a method is provided that includes generating for a code segment of a first process an instruction dependency graph (e.g., a runtime instruction dependency graph) representative of behavior of the first process, obtaining (e.g., generating or retrieving an already generated) respective one or more instruction dependency graphs representative of behaviors of code segments one or more other processes (target processes), and determining, based on the first instruction dependency graph for the first process and the respective one or more instruction dependency graphs for the one or more other processes, a level of similarity between the first process and at least one of the one or more other processes. In some embodiments, the method further includes identifying the at least one of the one or more other processes as a code relative (or a code clone) of the first process in response to a determination that the level of similarity between the first process and the at least one of the one or more other processes exceeds a pre-determined threshold. In some embodiments, the first instruction dependency graph comprises multiple subgraph portions and data defining dependency between the multiple subgraph portions, and each of the respective one or more instruction dependency graphs comprises an associated set of subgraph portions and data defining dependency between the subgraph portions. In some embodiments, determining the level of similarity between the first process and the at least one of the one or more other processes may include determining, through a subgraph isomorphism process, the level of similarity between the first process and the at least one of the one or more other processes based on the multiple subgraph portions and the data defining dependency between the multiple subgraph portions for the first instruction dependency graph, and based on the associated sets of subgraph portions and the data defining the dependency between the subgraph portions for the one or more instruction dependency graphs for the one or more other processes. In some embodiments, generating the first instruction dependency graph may include generating a multi-vertices graph with edges connecting at least some of vertices in the graph, with each of the vertices representing at least one instruction of the code segment, and each of the edges representing a dependency between corresponding two or more instructions represented as two or more vertices in the graph. In such embodiments, determining the level of similarity between the first process and the at least one of the one or more other processes may include determining a ranking of the vertices of the multi-vertices graph for the first process, and deriving a first dynamic vector for the first process, representative of an ordering of the vertices of the multi-vertices graph, based on the determined ranking of the vertices of the multi-vertices graph. In such embodiments, the method may further include computing a similarity distance between the first dynamic vector for the first process and at least one dynamic vector derived for at least one of the one or more instruction dependency graphs for the at least one of the one or more other processes.

With reference to FIG. 1, a diagram of a high level architecture of a system 100 to detect code relatives (and which may also be used to detect code clones) is shown. The system 100, based on which the DyCLINK implementation may be realized, includes two major components or subsystems, namely, a graph construction subsystem 110 and a subgraph crawling subsystem 120. The graph construction subsystem 110 is configured to determine dependencies between program portions (provided using any type of programming language, including, but not limited to, Java, and containing any type of instruction such as, in the case of the Java example, bytecodes), to construct a dynamic instruction graph (e.g., dynamic bytecode graph, when applied to Java programs). The subgraph crawling subsystem is 120 configured to detect code segments of testing programs that have high similarity to, for example, target programs (e.g., publicly available programs, including API's) segments, thus identifying these segments as potentially replaceable by the global programs (APIs) segments.

Code relatives and code clones may be defined as follows:
Code clone: Given a code fragment $CF_1$, and a code fragment $CF_2$, $CF_1$ and $CF_2$ are code clones if Sim $(CF_1, CF_2)$ thresh, where Sim is a similarity function and thresh is a pre-defined threshold.
Code skeleton: Either a continuous or discontinuous set of code lines.
Code relative: An execution of a code skeleton, CS, generates some behavioral representation, Exec(CS), of that skeleton. Any behavioral representation, such as output values, may be used in detecting code relatives. In the implementations described herein (including the DyCLINK implementation), a dynamic instruction graph is chosen as the behavioral representation. Given a Sim and a thresh, two code skeletons, $CS_1$ and $CS_2$, are deemed to be code relatives if $Sim(Exec(CS_1), Exec(CS2)) \geq thresh$.

In some embodiments, a program/process 102 is presented as input to an instruction instrumenter 112 (of the graph construction subsystem 110) which is configured to insert an instruction recorder at the beginning of each input program (e.g., the DyCLINK injects a recorder at the beginning of a program by instrumenting the program). If the instruction (of the input program 102) invokes another program (e.g., a method), the recorder recursively collects the graph of the invoked method. Immediately before returning from the current method/process, the graph construction subsystem 110 merges all recorded instructions, dependencies, and recursively-collected graphs to construct a full, representative graph of the current method. Once all the representative graphs are generated for a given codebase, the data is passed to the subgraph crawling subsystem 120. The search for code segments with high similarity can then be modeled as the search for isomorphic subgraphs of their representative instruction graphs. In some embodiments, a link analysis-based subgraph isomorphism solver (referred to as LinkSub) is configured to search for isomorphic subgraphs. In some embodiments, such a link analysis-based subgraph isomorphism solver may be configured to solve this problem in $O(V_{ta}*(\log V_{ta}+V^2_{te}+E_{te}))$ time, where $V_{ta}$ represents the vertex number in "target" programs/methods (a global collection of programs/processes/methods generally available to the public) and $V_{te}$ and $E_{te}$ represent the vertex and edge numbers in the initial "testing" programs/processes/methods. In other embodiments, example link analysis-based subgraph isomorphism solvers may be configured to search for subgraphs with a higher or lower complexity that depends, in part, on the degree of precisions achieved to identify target subgraphs.

For the purpose of illustrating the systems, methods, and other implementations described herein, Java programs are used as illustrative examples. The source code of a Java program may be first compiled into a sequence of Java instructions. The JVM reads each instruction into its stack machine and then performs computations based on the specifications of these instructions. Consider the instruction iadd in the mull( ) process depicted in FIG. 2 as an example (a listing 210 for the mult( ) process is provided in the left-hand side of FIG. 2). The iadd instruction in line 9 (marked as element 212) takes two integer values, loaded by iload 3 (element 214 in FIG. 2) and iload/(element 216 in FIG. 2) onto the JVM's stack, adds them, and puts the sum back onto the stack. The DyCLINK implementation shadows the JVM's stack machine to derive the dependencies between instructions. In the iadd example, the iadd instruction depends on iload 3 and iload 1. In addition to dependencies based on the Java specification, the DyCLINK implementation also considers read-write and control dependencies between instructions. Reader instructions read variable values (written by writer instructions), and control instructions decide which instructions are executed after themselves. Table 1 lists the pertinent example Java instructions for these three types. It is to be noted that the implementations described herein may be used with instructions sets of other computing systems, and that the example instructions provided in Table 1 below are for illustrative purposes only, and that the implementations described herein are applicable, without limitation, to other types of programs/programming languages.

TABLE 1

| | |
|---|---|
| Reader | iload, lload, fload, dload, aload, iinc, getfield, getstatic |
| Writer | istore, lstore, fstore, dstore, astore, iinc, putfield, putstatic |
| Control | if_icmpeq, if_icmpne, if_icmplt, if_icmpge, if_icmpgt, if_icmple, if_acmpeq, if_acmpne, ifeq, ifne, iflt, ifge, ifgt, ifle, ifnull, ifnonnull, goto, tableswitch, lookupswitch |
| Method (Process) | invokevirtual, invokestatic, invokespecial, invokeinterface |

The DyCLINK implementation (and/or other such similar implementations) uses the three types of instructions mentioned above to compute dependencies. However, when a caller process invokes the callee process (also referred to as the "called" process), the DyCLINK implementation is configured to merge the callee's graph into the caller's, instead of just recording the instruction dependencies (as will be discussed in greater detail below).

A graph representation for a process (e.g., a method or program) is defined as $G=\{V, E, I_V, I_E\}$, where V represents a set of nodes (vertices) in a graph and $E \subseteq V \times V$. $I_V$ and $I_E$ are two mapping functions, which project a vertex and an edge to a possible vertex label and edge label, respectively. Based on this definition of labeled graphs in general, a dynamic instruction graph $G_{dig}$ is defined to be a directed, weighed, labeled graph of the following form:

$$G_{dig} = \{V_{inst}, E_{dep}, I_{V\ instr}, I_{E\ dep}\}$$

Each vertex $v \in V_{inst}$ is derived from one or more instructions in the input program and can be mapped to that instruction's byte-code by the function $I_{V\ inst}$. Each edge $e_{i,j} \in E_{dep} = (v_i, v_j)$, where $v_i, v_j \in V_{inst}$ are derived from instructions which have at least one type of dependency between them. The label for such an edge is a tuple consisting of the dependency type(s) and their weighted frequencies over the two nodes according to, for example:

$$I_{E\ dep}(v_i, v_j) = (dep_{i \to j}, wFreq(dep_{i \to j}, i, j))$$

where $dep_{i \to j}$ is the set of dependency types between $v_i$ and $v_j$, and wFreq( ) is a function to map a set of dependency types to their weighted frequencies over two instructions. In the example DyCLINK implementation, three types of dependencies are defined, namely, $\{dep_{inst}, dep_{write}, dep_{control}\}$, each of which has its own individual weight, which is configurable. The definition of the weighted frequency between $v_i$ and $v_j$ is as follows:

$$wFreq(dep_{i \to j}, i, j) = \Sigma_{dep \in dep_{i \to j}} dep.weight * freq(dep, V_{inst_i}, V_{inst_j})$$

where freq(dep, $V_{inst\ i}$, $V_{inst\ j}$) records how many times dep occurs between the instructions corresponding to $V_{inst\ i}$ and $V_{inst\ j}$ during the execution of their containing process/method.

Figure 2:
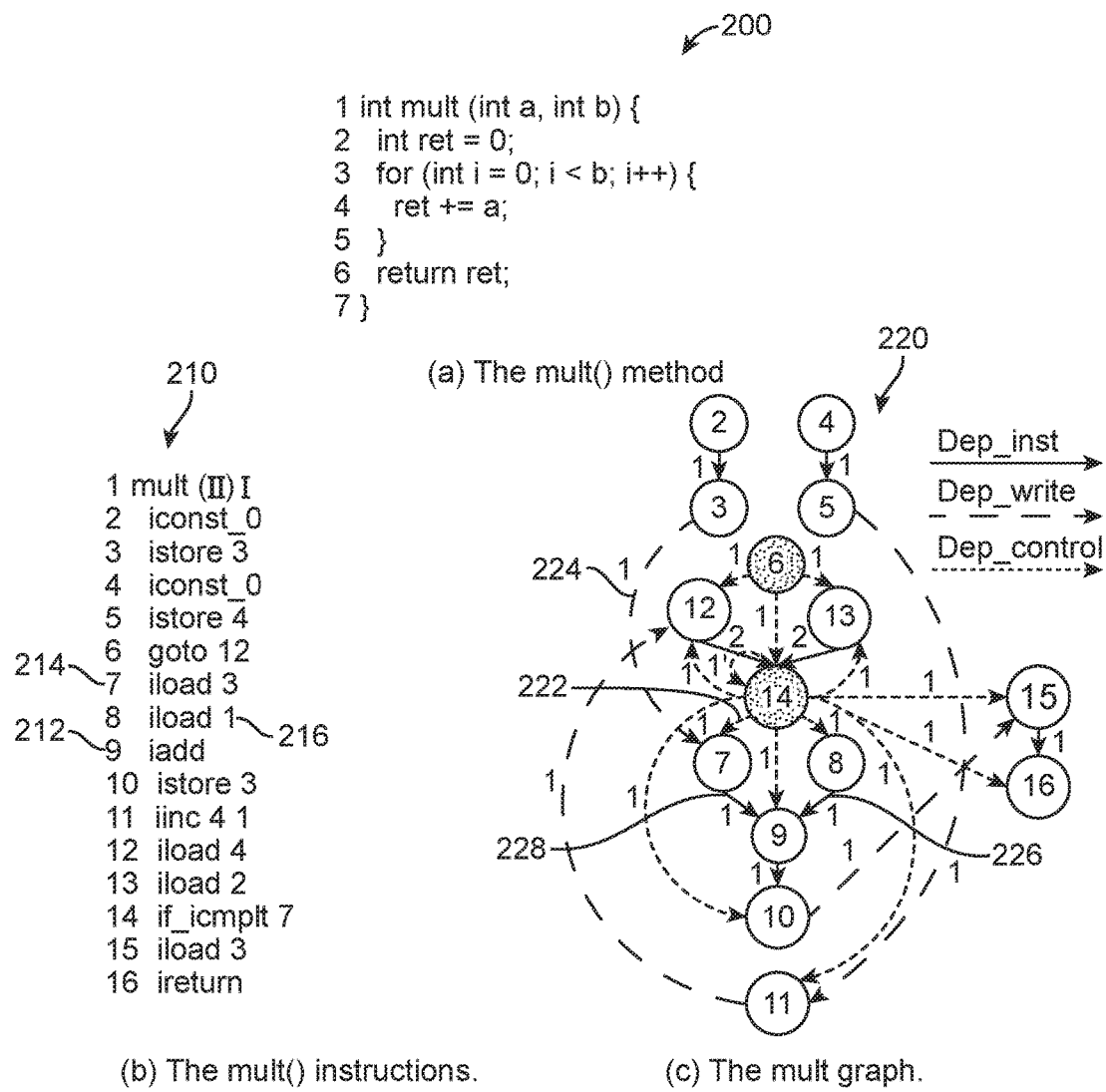
FIG. 2 is an example listing of instructions of a process, and a diagram of a corresponding graph representation.

With continued reference to FIG. 2, graph construction for the example mult( ) process 210 is performed to generate a graph representation 220. As shown, each bytecode instruction (e.g., for Java processes) from the example program 210 has a corresponding vertex (depicted as a circle) in the representative graph 220 generated therefor. The details of each edge (dependency) type are as follows:

$dep_{inst}$: An instructional dependency defined by the JVM Specification.

$dep_{write}$: A data dependency between the writer instruction and the corresponding reader instruction. This type of dependency may be computed by the example DyCLINK implementation (example reader and writer instructions are listed in Table 1). In some embodiments, read/write instructions are not includes for array elements, because they are modeled as $dep_{inst}$.

$dep_{control}$: A control dependency, as defined by the example DyCLINK implementation described herein, is different from the traditional definition, which records all instructions that fall under the label pointed to by the control instruction. Instead, the example DyCLINK implementation derives the transitional probability from a control instruction to each of its successors, so every instruction executed after a control instruction is considered to be one of its dependents, up until the next control instruction appears.

As noted, to record executed instructions of a process and generate the corresponding graph representation, a process recorder was developed and implemented within DyCLINK. This process recorder, performed in the example system 100 by the instruction instrumenter 112 of the graph construction subsystem 110, also computes each type of dependency between instructions. The example DyCLINK implementation described herein may inject this process recorder at the beginning of each method (requiring Java bytecode instrumentation for Java-implemented processes).

The construction/generation of a graph may proceed as follows (with continued reference FIG. 2 as an example of the graph-generation operations). In some embodiments, the graph construction (e.g., by a subsystem such as the graph construction subsystem 110) is performed during run-time execution of the process for which code relatives (and/or clones or near clones) are to be identified/detected, and thus, the process is executed, e.g., via a program execution unit 114 (which may include one or more processors, or other types of programmable devices, controlled by an operating system and/or some application program constituting part of the graph construction subsystem 110). For the purposes of the present example, the mult( ) process is executed with the input arguments {a=8, b=1}. The line numbers of each instruction listed in the listing 210 of FIG. 2 may be used as a label or ID in order to generate the graph (although other ID values or types may be used in addition to, or in place of, the line numbers). For example, the iload 3 with is assigned an identification value of ID 7. This instruction loads the integer value of the #3 local variable on the stack. When this instruction is executed, the control instruction is if_icmplt 7 (corresponding to ID 14), results in the dependency $dep_{control}(14, 7)$ (depicted as the edge 222 in FIG. 2, which is illustrated as a dense-dashed (dotted) line representative of a control-type dependency). Because iload 3 is a reader instruction that loads the #3 local variable, the example DyCLINK implementation checks the latest writer instruction of the #3 local variable, which is istore 3 (with an ID 3, corresponding to the third instruction of the listing 210). This results in a dependency $dep_{write}(3, 7)$, depicted as a dashed line/edge (representative of a write-type dependency) 224 connecting the vertex 3 with the vertex 7. The instruction iadd, with an ID 9, has two $dep_{inst}$ from iload 3 and iload 1, because it uses two values based on the JVM specification, and is represented in the example graph 220 as the edges 226 and 228 (depicted using solid-line edges representative of instruction-type dependencies).

Thus, following the graph construction procedure, the resultant $G_{dig}$ graph 220 for the mult( ) process (represented in this example as a Java sequence of instructions) is generated, with each instruction forming a vertex in the graph with a unique identifier (which, in this example, corresponds to the line number in the listing of the instruction sequence 210 of FIG. 2). Each edge represents a dependency between two (or more) instructions. The number for each edge is its wFreq(dep i→j, i,j) value. In the example of FIG. 2, the weighted number was set to 1 for each dependency type.

Figure 3:
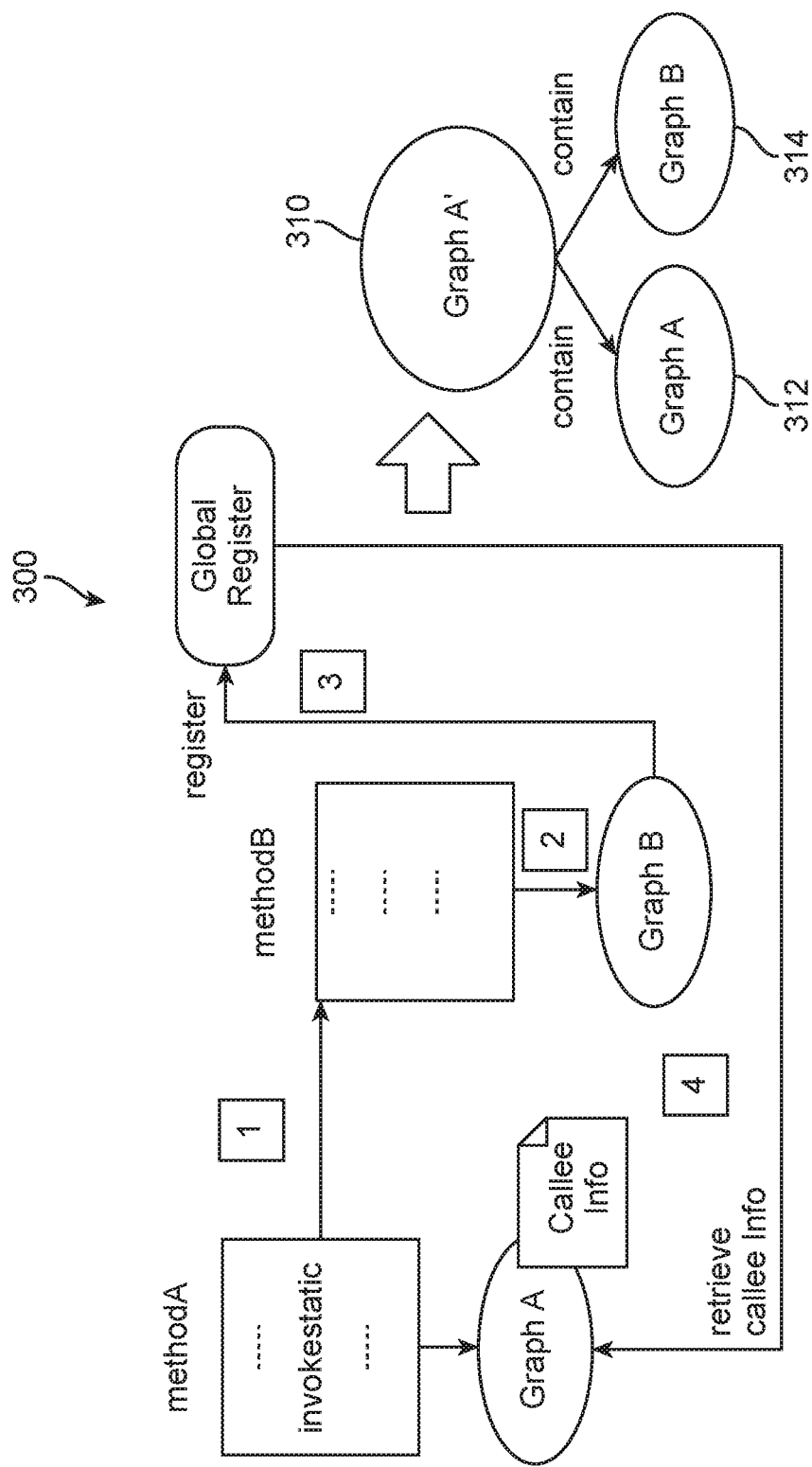
FIG. 3 is a diagram of graph merging of a caller and callee processes.

In some embodiments, when a method (caller) invokes another method (callee), the implementations described herein (such as the example DyCLINK implementation) obtain the information of the callee graph and store it in the caller. FIG. 3 is a diagram 300 depicting graph merging of a caller and callee processes/methods, illustrating how the example DyCLINK implementation tracks the information of the callee process. As shown, in this example the caller, methodA, invokes a callee, in this example methodB. Prior to completion of a process, the process recorder serializes the representative graph ($G_{dig}$), and registers the graph ID of the current process in a global register, which tracks every process/method graph in the execution session. After invoking methodB, methodA uses the recorder to obtain the graph ID of methodB from the global register and to store this information for merging purposes. The final $G_{dig}$ (e.g., a graph 310 in FIG. 3) of methodA contains its own process (e.g., graph 312) and the $G_{dig}$ from methodB (graph 314 in FIG. 3). An objective of merging is to construct the full graph of the process that contains its own instructions and all instructions from its callee processes/methods. Because the implementations described herein (including the example DyCLINK implementation) record the execution frequency of each callee method for the caller, connections between instructions across processes/methods can be stored for crawling inter-method code relatives.

In some embodiments, once graph merging is completed, the implementations described herein may be configured to compact (e.g., using a graph compacting subsystem 130, of the system 100, depicted in FIG. 1) the generated graphs. For each caller process/method, the DyCLINK implementation, for example, keeps information of each callee method. However, if a callee method is invoked thousands of times, the graph size of the caller graph will be very large, because each process/method execution generates a corresponding graph (e.g., $G_{dig}$). Recording each callee graph may hinder/inhibit the final analysis of graph similarity. Furthermore, what is important is the execution frequency of the same type of $G_{dig}$, from a callee method. To efficiently classify $G_{dig}$'s from the same method, in some embodiments, all $G_{dig}$'s derived from the same callee process/method are grouped by their vertex numbers and edge numbers. In a group, all $G_{dig}$'s have the same number of vertices and edges. When the DyCLINK implementation tries to record the information of a callee process in the caller, it first checks if the corresponding group already exists in the caller by comparing the vertex and edge numbers of the current callee. If it does not exist, a new group is created and the current callee $G_{dig}$ becomes the representative of this group. If a graph representation for the callee already exists, the DyCLINK implementation obtains the representative of this group and increases the execution frequency of this representative. It is assumed that if the $G_{dig}$'s from the same callee process have the same numbers of vertex and edge, they share the same features and should be in the same group.

After graph construction for the initial process/program (i.e., the testing process/program) is completed, the systems, method, and other implementations described herein can commence the procedure to identify, from a codebase (e.g., implemented as one or more repositories of coded process and/or behavioral graphs therefor), code relatives (including code clones or near-clones), e.g., using the subgraph crawling subsystem 120 depicted in FIG. 1. For example, the DyCLINK implementation described herein is configured to enumerate pairs of methods/processes in the codebase. Thus, given n methods, there are at most n*(n−1) method pairs. Both methods/processes in a method pair serve as the target method (i.e., the method for which code relative or code clones is to be detected/identified) and the testing one. Because the target and testing methods can both be represented as graphs, code relative detection can be modeled as a subgraph isomorphism problem. A subgraph isomorphism problem can be represented as follows:

Given two graphs,$G1=(V,E),G2=(V',E')$,does $G1$ have a subgraph $G1_s \cong G2$ where $G1_s=(V_s,E_s)$: $V_s \subseteq V, E_s = E \cap V_s \times V_s$?

The subgraph isomorphism problem can also be referred to as sub-graph matching. There are generally two types of subgraph matching: exact and inexact. For exact subgraph matching, G1 needs to have a subgraph that is substantially the same as G2. Different procedures, such as an Ullman algorithm and VF2 algorithm, may be used to solve the exact subgraph matching problem.

Inexact subgraph matching is generally more complex, because G1 needs to have similar, but not necessarily exactly the same subgraph to G2. Various graph kernels attempt to represent graphs by some of their features and then calculate graph similarity. Two problems of using these graph kernels approaches include:

Memory—Most of these graph kernels require generating the adjacency matrix of a graph. However, because the vertex numbers for $G_{dig}$s can be large (10K+), the memory requirement can be huge.

Time—The time complexity to solve the inexact graph isomorphism problem for various conventional graph kernels is usually between $O(V^4)$ to $O(V^6)$. In order to search for similar subgraphs in G1, it is necessary to enumerate every combination of vertices in G1 for G2 to match, which leads to unacceptable time complexity.

To solve the subgraph matching problem in $G_{dig}$ efficiently, a link-analysis-based subgraph isomorphism procedure, referred to herein as LinkSub, has been implemented. The conceptual procedure of LinkSub is provided in below:

---
Data: The target graph $G^{ta}_{dig}$ and the test graph $G^{te}_{dig}$
Result: A list of subgraphs in $G^{ta}_{dig}$, HotZones, which are similar to $G^{te}_{dig}$
profile$_{te}$ = profileGraph($G^{te}_{dig}$);
seq$_{ta}$ = sequence($G^{ta}_{dig}$);
assigned$_{ta}$ = locateCandidates(seq$_{ta}$, profile$_{te}$);
HotZones = ∅;
for sub in assigned$_{ta}$ do
    SD = staticDist(SV(sub), profile$_{te}$, SV);
    if SD > threshold$_{stat}$ then
        continue ;
    end
    DV$^{sub}_{target}$ = LinkAnalysis(sub);
    dynSim = calSimilarity(DV$^{sub}_{target}$, profile$_{te}$,DV );
    if dynSim > threshold$_{dyn}$ then
        HotZones ∪ sub ;
    end
end
return HotZones;

---

Thus, the LinkSub implementation described herein models an instruction graph of a process/method as a network, and utilizes the power of link analysis procedures, such as PageRank (i.e., a procedure used to compute the number and quality of links, in this case to vertices in a dependency graph, to obtain an estimate of how important any one of the vertices are) to rank each vertex in the network (other link-analysis procedures may be used). The vertex with the highest rank can be identified as the most important one in a $G_{dig}$. This vertex is called the centroid of a testing graph, $G^{te}_{dig}$ (even though this vertex is not necessarily in the center of a graph). Required information regarding $G^{te}_{dig}$ for subgraph matching, such as the instruction distribution and the centroid, is computed in the 'profileGraph' operations of the LinkSub procedure (as provided in the conceptual outline above). All instructions of a target graph, $G^{ta}_{dig}$ are listed, in sequence by the feature defined in the sequence step to facilitate locating candidate subgraphs. In some embodiments, the execution time stamp of each instruction is used as the feature to list instructions in $G^{ta}_{dig}$. The centroid of $G^{te}_{dig}$ is used to locate candidate subgraphs in $G^{ta}_{dig}$, in the locateCandidates' module/step. The centroid vertex (instruction) of the method can also help identify the behavior of this method.

Executing PageRank (or some other link analysis procedure) on every candidate subgraph in $G^{ta}_{dig}$ can affect the performance of, for example, the DyCLINK implementation described herein, if the candidate number is large. Thus, in some embodiments, a static filter (e.g., the 'staticDist' operations provided in the above conceptual outline) can be used to compute an Euclidean distance between the distribution vectors of instructions from $G^{te}_{dig}$ and a candidate subgraph from the $G^{ta}_{dig}$. The resultant distribution vector of instructions is represented as SV($G_{dig}$). If the distance is higher than the static threshold (e.g., threshold$_{stat}$ in the conceptual outline above), which may be defined by the user, then the particular pair of subgraphs for which a matching determination is being made is rejected. If a candidate subgraph from the $G^{ta}_{dig}$ passes the static filter check, the DyCLINK implementation (and/or other similar implementations to perform code relative detection) may apply its link analysis processing to this candidate.

For non-rejected candidate pairs, the DyCLINK implementation flattens and sorts both the $G^{te}_{dig}$ and the current subgraph from the $G^{ta}_{dig}$ to a dynamic vector based on, for example, the PageRank of each vertex. This dynamic vector is represented (in the above example conceptual outline) as DV($G_{dig}$) and its length is equal to the vertex number of $G_{dig}$. In some embodiments, the Jaro-Winkler Distance may be used to measure the similarity of two DVs, which represents the similarity between two $G_{dig}$s, in the 'calSimilarity' step of the above LinkSub conceptual outline. Computation of a Jaro-Winkler distance generally has better tolerance of element swapping in the array than, for example, Edit Distance, and is also configurable to boost similarity if the first few elements in two strings or arrays are the same. Other similarity distance procedures may be used instead of, or in addition to, the Jaro-Winkler distance procedure. These two features are beneficial for the DyCLINK implementation because the length of DV($G_{dig}$) is usually high, which implies frequent instruction swapping. However, what is being detected is the behavior of processes/methods, which are driven by the top ranked instructions in DV($G_{dig}$). If the similarity between the subgraph from the $G^{ta}_{dig}$ and the $G^{te}_{dig}$ is higher than the dynamic threshold (threshold$_{dyn}$), the DyCLINK implementation identifies this subgraph as being isomorphic to the $G^{te}_{dig}$. A subgraph determined to be similar to the $G^{te}_{dig}$ is deemed to be a code relative (Hot Zone) in the $G^{ta}_{dig}$.

Thus, and with reference again to FIG. 1, in some embodiments, the subgraph crawling subsystem 120, configured to determine based on the generated first dependency graph and the generated respective one or more dependency graphs for the one or more other (target) processes, may include a Link Analyzer 122 configure to determine for the first dependency graph a ranking of the vertices of the first dependency graph, and to also obtain/determine for at least one of the respective one or more dependency graphs for the target processes a corresponding at least one ranking of the vertices of the at least of the one or more dependency graphs. As noted, the ranking operations may be performed according to various ranking processes, such as, for example, the PageRank procedure. Based on results of the ranking process performed on the first dependency graph (of the testing process) and on the at least one dependency graph for the one or more target (i.e., globally/publicly available) processes, dynamic vectors for the first dependency graph and the at least one dependency graph of the target/public process are obtained or generated (e.g., also using the implementation of the Link Analyzer 122). It is to be noted that the generation of the dependency graph for the target (global) processes, and the ranking processing for those dependency graphs may have been performed at an earlier or later time than when the graph generation and ranking processing were performed for the testing process (e.g., the dependency graphs and/or ranking procedure for the target processes may have been performed and stored at remote servers at an earlier time, so that subsequently dependency graphs for newly developed/implemented processes could be compared to those earlier processed dependency graphs and respective rankings).

As further depicted in FIG. 1, the subgraph crawling subsystem 120 includes a Horizon Identifier 124 configured to derive a similarity distance (e.g., using procedures such as the Jaro-Winkler distance procedure, the Edit Distance procedure, etc.) based on dynamic vectors derived through the LinkAnalysis processing applied to the dependency graphs. If the derived similarity distance between the dynamic vector for the first dependency graph (for the initial testing process) and the dynamic vector for the at least one dependency graph for the one or more target processes exceeds a threshold (e.g., threshold$_{dyn}$), the target process corresponding to the at least one dependency graph is deemed to be a code relative of the initial, testing, process.

Figure 4:
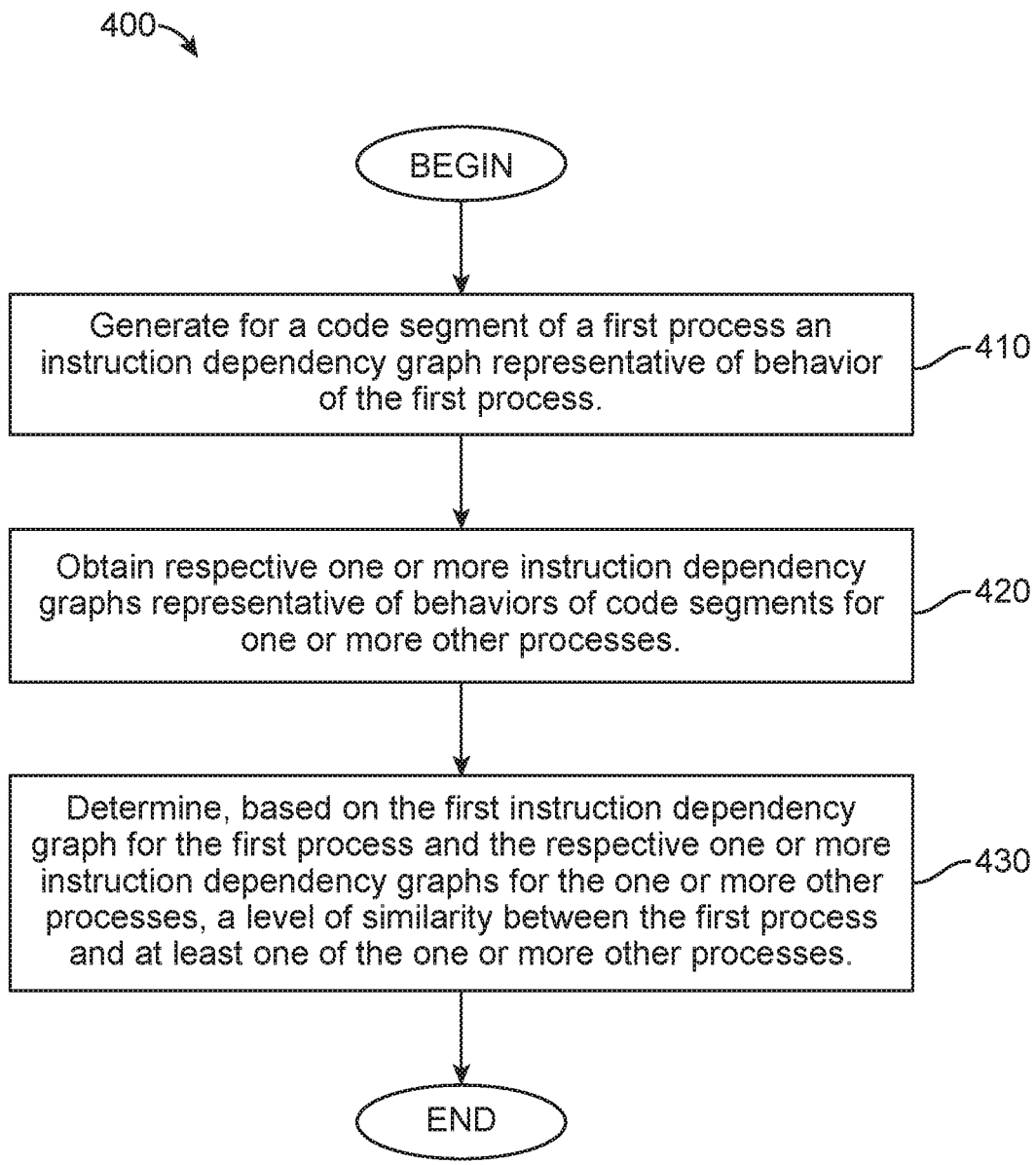
FIG. 4 is a flowchart of a procedure to detect code relatives.

With reference now to FIG. 4, a flowchart of an example procedure 400 to detect code relatives is shown (such a procedure may be implemented on a system such as the system 100 of FIG. 1, which may be similar to the DyCLINK implementation described herein). The procedure 400 includes generating 410 for a code segment of a first process (also referred to as a testing process/method/or program) an instruction dependency graph representative of behavior of the first process. In some embodiments, generating the first instruction dependency graph may include generating a multi-vertices graph with edges connecting at least some of vertices in the graph, with each of the vertices representing at least one instruction of the code segment, and each of the edges representing a dependency between corresponding two or more instructions represented as two or more vertices in the graph.

The procedure 400 also includes obtaining 420 respective one or more instruction dependency graphs (e.g., generating the graphs when executing the procedure 400, retrieving previously generated graphs from local or remote servers, etc.) representative of behaviors of code segments for one or more other processes (also referred to as target methods/programs/or methods). In some embodiments, these one or more processes may be available to multiple users (e.g., such processes may be stored at various accessible databases or repositories). In some embodiments, the first instruction dependency graph may include multiple subgraph portions and data defining dependency between the multiple subgraph portions, and each of the respective one or more instruction dependency graphs may include an associated set of subgraph portions and data defining dependency between the subgraph portions (generation/construction of the instruction dependency graphs for the one or more other processes may be done independently of the generation of the first testing process, i.e., graph construction may be done over time and stored at remote repositories to allow subsequent, future access to the graphs).

Having generated the first instruction dependency graph and having obtained (e.g., generated or retrieved) the one or more instruction dependency graphs for the one or more other processes, a level of similarity between the first process and at least one of the one or more other processes is determined 430 based on the first instruction dependency graph for the first process and the respective one or more instruction dependency graphs for the one or more other processes. For example, in some embodiments, determining the level of similarity between the first process and the at least one of the one or more other processes may include determining, through a subgraph isomorphism process, the level of similarity between the first process and the at least one of the one or more other processes based on the multiple subgraph portions and the data defining dependency between the multiple subgraph portions for the first instruction dependency graph, and based on the associated sets of subgraph portions and the data defining the dependency between the subgraph portions for the one or more instruction dependency graphs for the one or more other computer programs. In embodiments in which the first instruction dependency graph is generated as a multi-vertices graph with edges connecting at least some of vertices in the graph, with each of the vertices representing at least one instruction of the code segment, and each of the edges representing a dependency between corresponding two or more instructions represented as two or more vertices in the graph, determining the level of similarity between the first process and the at least one of the one or more other processes may include determining a ranking of the vertices of the multi-vertices graph for the first process, and deriving a first dynamic vector for the first process, representative of an ordering of the vertices of the multi-vertices graph, based on the determined ranking of the vertices of the multi-vertices graph. Subsequently, a similarity distance may be computed (e.g., based on the Jaro-Winkler distance procedure) between the first dynamic vector for the first process and at least one dynamic vector derived for at least one of the one or more instruction dependency graphs for the at least one of the one or more other processes. In some embodiments, the at least one of the one or more other processes may be identified as a code relative of the first process in response to a determination that the level of similarity between the first process and the at least one of the one or more other processes exceeds a pre-determined threshold.

Figure 5:
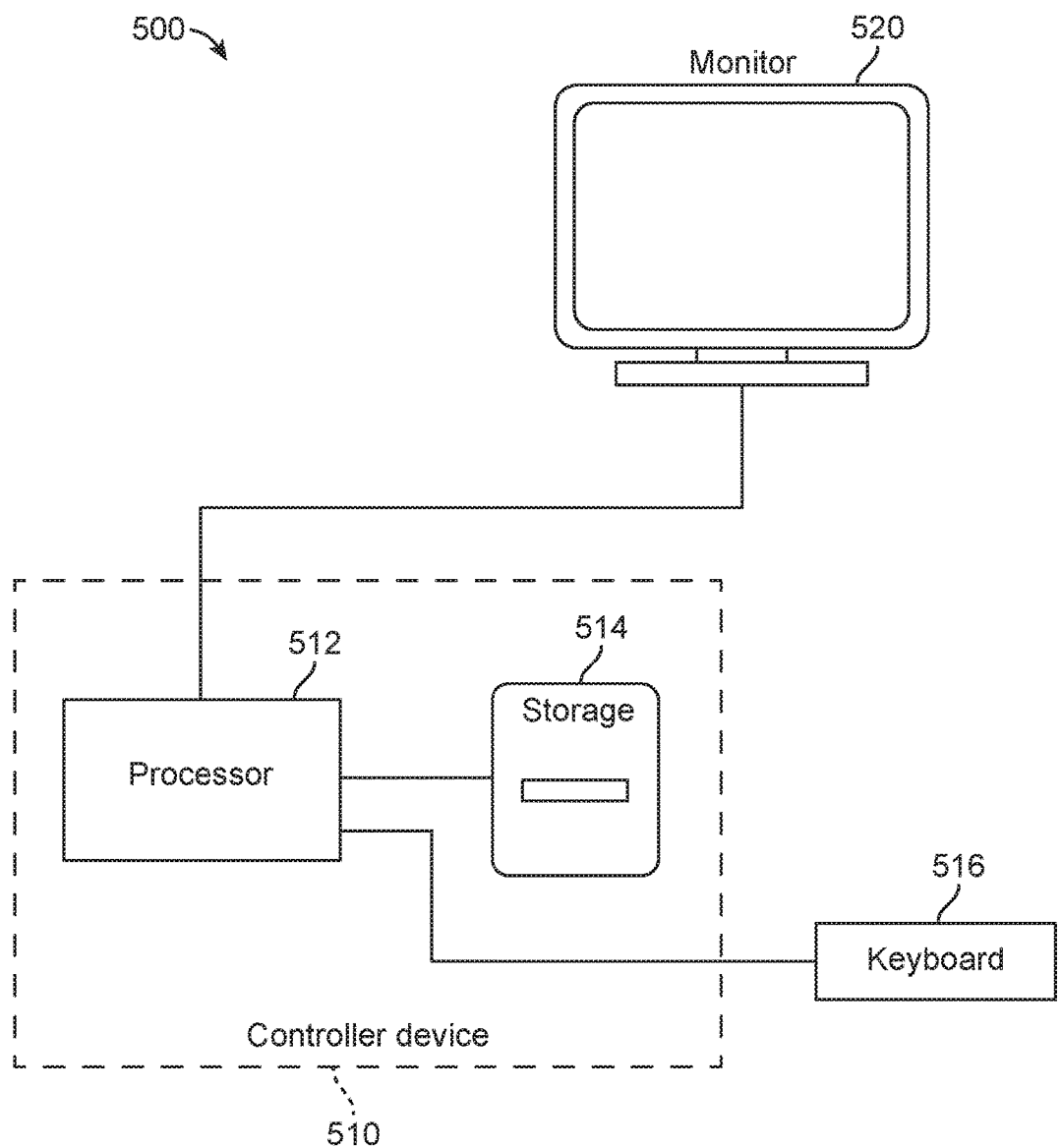
FIG. 5 is a diagram of an example controller system.

Performing the various operations described herein may be facilitated by a computing or controller system. Such a system may be configured to detect code relatives (including code clones). Particularly, with reference to FIG. 5, a diagram of an example controller system 500 is shown. The system 500 includes a controller device 510, such as a processor-based personal computer, a specialized computing device, and so forth, that includes, in some implementations, a processor-based unit such as central processor unit (CPU) 512. In some embodiments, the controller device 510 may be realized, at least in part, using modules such as an FPGA (field programmable gate array), an ASIC (application-specific integrated circuit), a DSP processor, etc. In addition to the CPU 512, the system includes main memory, cache memory and bus interface circuits (not shown in FIG. 5). The controller device 510 may include a mass storage element 514, such as a hard drive or flash drive associated with the system. The computing system 500 may further include a keyboard 516, or keypad, or some other user input interface, and a monitor 520, e.g., a CRT (cathode ray tube), LCD (liquid crystal display) monitor, etc., that may be placed where a user can access them.

The controller device 510 is configured to facilitate, for example, the procedures, techniques, and operations described herein. The storage device 514 may include a computer program product that when executed on, for example, a processor-based implementation of the controller device 510 causes the device to perform operations to facilitate the implementation of the procedures, techniques, and operations described herein to detect code relatives (including code clones).

The controller device 510 may further include peripheral devices to enable input/output functionality. Such peripheral devices may include, for example, a CD-ROM drive and/or flash drive (e.g., a removable flash drive), or a network connection (e.g., implemented using a USB port, a wireless transceiver, an Ethernet connection, etc.), for downloading related content to the connected system, and for communicating with remote nodes. Such peripheral devices may also be used for downloading software containing computer instructions to enable general operation of the respective system/device. As noted, alternatively and/or additionally, in some embodiments, special purpose logic circuitry, e.g., an FPGA (field programmable gate array), an ASIC (application-specific integrated circuit), a DSP processor, etc., may be used in the implementation of the system 500. Other modules that may be included with the controller device 510 are speakers, a sound card, a pointing device, e.g., a mouse or a trackball, by which the user can provide input to the system 500. The controller device 510 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing/controller system may include clients and servers. A client and server are generally remote from each other and typically interact through a communication network. The relationship of client and server generally arises by virtue of computer programs running on the respective computers and having a client-server relationship to each other.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/ or any suitable intangible media.

In some embodiments, the implementation described herein, including the DyCLINK implementation, may be used with a KNN-based software classification procedure to automatically classify programs. The high level procedure is provided below.

---

Data: The similarity computation algorithm SimAlg, the
  set of subject programs to be classified Programs and
  the number of the neighbors K
Result: The precision of SimAlg
  realLabel(Programs);
  $matrix_{sim}$ = computeSim(SimAlg, Programs);

-continued

```
succ = 0;
for p in Programs do
        neighbors = searchKNN(p, matrix_sim, K);
        p.predictedLabel = vote(neighbors);
        if p.predictedLabel = p.realLabel then
                succ = succ + 1;
        end
end
precision = succ / Programs.size;
return precision;
```

The K-Nearest Neighbors (KNN) classification procedure is applied to predict the label for each method/process. For each program, the K other programs that have the greatest similarity to the current one are searched in the searchKNN step. Each nearest neighbor program can vote for the current method by its real label in the vote step. The label voted by the greatest number of neighbor programs becomes the predicted label of the current program. In the event of a tie, the neighbors with the highest sum of similarity scores prevail.

Finally, the predicted label for a program is compared against its real behavioral label. If the predicted label is the same with the real label, the prediction of this method is marked as successful. The precision of a similarity computation algorithm (SimAlg) is defined as the percentage of programs it labels correctly.

In the experimentation and evaluation conducted, four (4) problem sets from Google Code Jam, one per year between 2011 and 2014, which have a total of 171 projects, were selected. Details for these problems sets and the number of projects are provided in table 600 of FIG. 6. The participants of the Google Code Jam could choose to implement their projects to either access the input file provided by Google automatically or read the input from the command line interactively. The 'Proj.' column in table 600 records two values: the first one for the number of total projects, and the second one for the number of the non-interactive projects. Only the latter was selected, which facilitates executing every project automatically. The total number of the non-interactive projects was 118. A KNN-based software label classification procedure (such as the one provided above in pseudocode) was then applied with both the DyCLINK implementation to compute the classification precision. For the 118 non-interactive projects, DyCLINK conducts about 130 millions subgraph matching.

Figure 7:
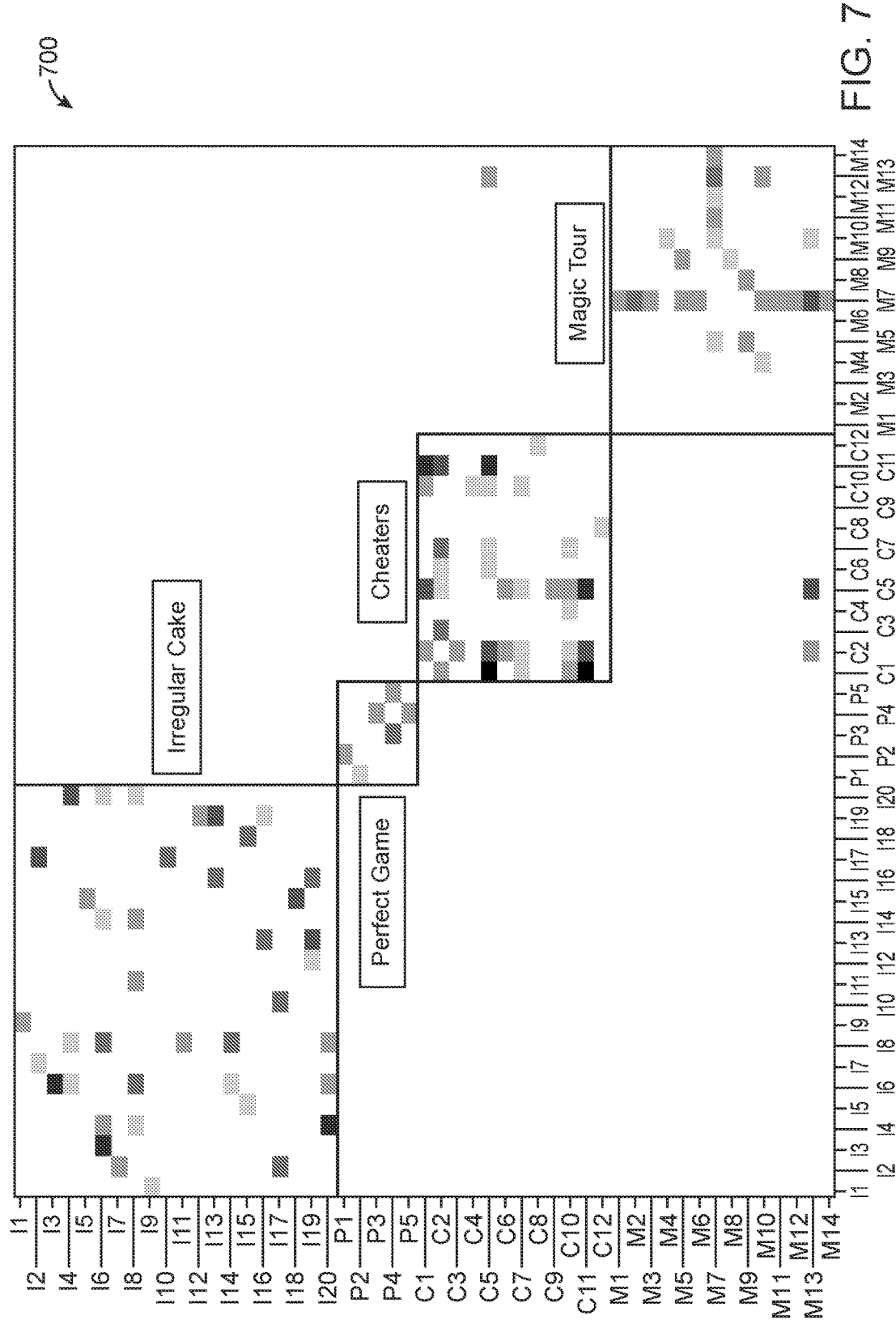
FIG. 7 is a graph of a software community clustering based on code relatives detected by the implementations described herein.

Based on programs with similar behavior (code relatives) detected by DyCLINK, projects can be clustered. FIG. 7 shows the clustering matrix based on one KNN-based classification results with K=5, LOC=10 and similarity threshold=0.9. Each element on both axes of the matrix represents a project indexed by the abbreviation of the problem set it belongs to and the project ID (the abbreviation of each problem set is provided in table 600 of FIG. 6). Projects are sorted by their project indices. Only projects that have at least one code relative with another project are recorded in the matrix, with the darker color in the cell representing a higher number of code relatives shared by two projects. The project relevance is the number of code relatives that two projects share. Each block on the matrix forms a Software Community, which fits in the problem sets that these projects aim to solve. The result of the KNN-based experiment showed that DyCLINK is capable of detecting programs having similar behavior and then cluster them for further usage (such as code search).

Thus, as described herein, implementations such as the DyCLINK system (configured similarly to the system 100 of FIG. 1) can dynamically detect code relatives among processes/methods at the instruction level. A code relative represents, for example, a pair of code skeletons having similar runtime behavior with or without the same implementation. The DyCLINK implementation converts the execution trace of a process/method into an instruction dependency graph at runtime. A Link Analysis-based subgraph isomorphism procedure, referred to as LinkSub, is used to detect subgraph matches (e.g., among thousands of instructions) efficiently. In a KNN-based code classification experiment, the DyCLINK implementation detected and searched for neighbor programs having similar behavior with high precision.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
   generating, through run-time execution of a code segment of a first process and using a set of input values, a dynamic instruction dependency graph representative of behavior of the executed code segment of the first process, with the dynamic instruction dependency graph comprising ranked vertices, each vertex corresponding to one or more executed instructions and associated with a ranked value, representative of an importance of the vertex relative to other vertices of the dynamic instruction dependency graph, computed according to respective number and quality of links to the each vertex;
   obtaining respective one or more instruction dependency graphs representative of behaviors of code segments for one or more other processes; and
   determining, based on the dynamic instruction dependency graph for the first process and the respective one or more instruction dependency graphs for the one or more other processes, a level of similarity between the first process and at least one of the one or more other processes, including comparing the computed rank values of the vertices of the dynamic instruction dependency graph to respective computed rank values of vertices in the respective one or more instruction dependency graphs for the one or more other processes.

2. The method of claim 1, further comprising:
   identifying the at least one of the one or more other processes as a code relative of the first process in response to a determination that the level of similarity between the first process and the at least one of the one or more other processes exceeds a pre-determined threshold.

3. The method of claim 1, wherein the dynamic instruction dependency graph comprises multiple subgraph portions and data defining dependency between the multiple subgraph portions, and wherein each of the respective one or more instruction dependency graphs comprises an associated set of subgraph portions and data defining dependency between the subgraph portions.

4. The method of claim 3, wherein determining the level of similarity between the first process and the at least one of the one or more other processes comprises:
   determining, through a subgraph isomorphism process, the level of similarity between the first process and the at least one of the one or more other processes based on the multiple subgraph portions and the data defining dependency between the multiple subgraph portions for the dynamic instruction dependency graph, and based on the associated sets of subgraph portions and the data defining the dependency between the subgraph portions for the one or more instruction dependency graphs for the one or more other processes.

5. The method of claim 1, wherein generating the dynamic instruction dependency graph comprises:
   parsing the code segment for the first process into multiple dependency graphs, wherein at least one of the multiple dependency graphs corresponds to a portion of the code segment that includes a call to another process portion, and another of the multiple dependency graphs corresponds to the called other process portion.

6. The method of claim 1, wherein generating the dynamic instruction dependency graph comprises:
   generating a multi-vertices graph with edges connecting at least some of the vertices in the multi-vertices graph, with each of the edges representing a dependency between corresponding two or more instructions represented as two or more vertices in the multi-vertices graph.

7. The method of claim 6, wherein each of the edges is assigned a dependency type value representative of a type of dependency between the instructions connected to the respective each of the edges.

8. The method of claim 6, wherein determining the level of similarity between the first process and the at least one of the one or more other processes comprises:

deriving a first dynamic vector for the first process, representative of an ordering of the vertices of the multi-vertices graph, based on the determined ranking of the vertices.

9. The method of claim 8, further comprising:
computing a similarity distance between the first dynamic vector for the first process and at least one dynamic vector derived for at least one of the one or more instruction dependency graphs for the at least one of the one or more other processes.

10. The method of claim 9, further comprising:
determining that the at least one of the one or more other processes is a code relative of the first process when the similarity distance computed between the first dynamic vector and the at least one dynamic vector derived for at least one of the one or more instruction dependency graphs, corresponding to the at least one of the one or more other processes, exceeds a dynamic pre-determined dynamic threshold.

11. The method of claim 1, wherein obtaining the respective one or more instruction dependency graphs comprises:
using a subgraph crawling subsystem to search for the respective one or more instruction dependency graphs in remote serves and repositories.

12. The method of claim 1, wherein obtaining the respective one or more instruction dependency graphs comprises:
selecting from a plurality of candidate instruction dependency graphs the one or more instruction dependency graphs based on a determination that Euclidean distances between a distribution vector of instructions from the dynamic instruction dependency graph and respective distribution vectors of instructions for the respective one or more instruction dependency graphs exceeds a pre-determined threshold.

13. A system comprising:
at least one processor; and
storage media comprising computer instructions that, when executed on the at least one processor, cause operations comprising:
generating, through run-time execution of a code segment of a first process and using a set of input values, a dynamic instruction dependency graph representative of behavior of the executed code segment of the first process, with the dynamic instruction dependency graph comprising ranked vertices, each vertex corresponding to one or more executed instructions and associated with a ranked value, representative of an importance of the vertex relative to other vertices of the dynamic instruction dependency graph, computed according to respective number and quality of links to the each vertex;
obtaining respective one or more instruction dependency graphs representative of behaviors of code segments for one or more other processes; and
determining, based on the dynamic instruction dependency graph for the first process and the respective one or more instruction dependency graphs for the one or more other processes, a level of similarity between the first process and at least one of the one or more other processes, including comparing the computed rank values of the vertices of the dynamic instruction dependency graph to respective computed rank values of vertices in the respective one or more instruction dependency graphs for the one or more other processes.

14. The system of claim 13, wherein the computer instructions comprise one or more further instructions to cause further operations comprising:
identifying the at least one of the one or more other processes as a code relative of the first process in response to a determination that the level of similarity between the first process and the at least one of the one or more other processes exceeds a pre-determined threshold.

15. The system of claim 13, wherein the dynamic instruction dependency graph comprises multiple subgraph portions and data defining dependency between the multiple subgraph portions, and wherein each of the respective one or more instruction dependency graphs comprises an associated set of subgraph portions and data defining dependency between the subgraph portions.

16. The system of claim 15, wherein determining the level of similarity between the first process and the at least one of the one or more other processes comprises:
determining, through a subgraph isomorphism process, the level of similarity between the first process and the at least one of the one or more other processes based on the multiple subgraph portions and the data defining dependency between the multiple subgraph portions for the dynamic instruction dependency graph, and based on the associated sets of subgraph portions and the data defining the dependency between the subgraph portions for the one or more instruction dependency graphs for the one or more other processes.

17. The system of claim 13, wherein generating the dynamic instruction dependency graph comprises:
generating a multi-vertices graph with edges connecting at least some of the vertices in the multi-vertices graph, with each of the edges representing a dependency between corresponding two or more instructions represented as two or more vertices in the multi-vertices graph.

18. The system of claim 17, wherein determining the level of similarity between the first process and the at least one of the one or more other processes comprises:
deriving a first dynamic vector for the first process, representative of an ordering of the vertices of the multi-vertices graph, based on the determined ranking of the vertices of the multi-vertices graph;
computing a similarity distance between the first dynamic vector for the first process and at least one dynamic vector derived for at least one of the one or more instruction dependency graphs for the at least one of the one or more other processes; and
determining that the at least one of the one or more other processes is a code relative of the first process when the similarity distance computed between the first dynamic vector and the at least one dynamic vector derived for at least one of the one or more instruction dependency graphs, corresponding to the at least one of the one or more other processes, exceeds a dynamic pre-determined dynamic threshold.

19. A non-transitory computer readable media storing a set of instructions executable on at least one programmable device that, when executed, causes operations comprising:
generating, through run-time execution of a code segment of a first process and using a set of input values, a dynamic instruction dependency graph representative of behavior of the executed code segment of the first process, with the dynamic instruction dependency graph comprising ranked vertices, each vertex corresponding to one or more executed instructions and associated with a ranked value, representative of an importance of the vertex relative to other vertices of the dynamic instruction dependency graph, computed according to respective number and quality of links to the each vertex;

obtaining respective one or more instruction dependency graphs representative of behaviors of code segments for one or more other processes; and determining, based on the dynamic instruction dependency graph for the first process and the respective one or more instruction dependency graphs for the one or more other processes, a level of similarity between the first process and at least one of the one or more other processes, including comparing the computed rank values of the vertices of the dynamic instruction dependency graph to respective computed rank values of vertices in the respective one or more instruction dependency graphs for the one or more other processes.

* * * * *